PatentedAug.19,1969

3,461,616
METHODS AND APPARATUS FOR SHARPENING
RAZOR BLADES OR SIMILAR CUTTING TOOLS
Warren I. Nissen, Topsfield, and Robert M. Atwater,
Weymouth, Mass., assignors to The Gillette Company,
Boston, Mass., a corporation of Delaware
Filed Oct. 14, 1966, Ser. No. 586,873
Int. Cl. B24b 3/48, 1/00; B26b 21/54
U.S. Cl. 51—87                          12 Claims

ABSTRACT OF THE DISCLOSURE

Razor blade sharpening apparatus includes two honing wheels of modified frustoconical configuration that are five inches long, and have a radius of 2.800 inches at their larger ends and a radius of 2.712 inches at their smaller ends. The wheels are mounted for rotation about parallel axes that are inclined at a tilt angle of 5° relative to a blade path defined by a blade holder. A spiral helix formed on the surface of each wheel defines a series of lands that are interengaged to define a nip when the wheels are juxtaposed in honing position. This apparatus produces a smoothly curved convex final facet with an included angle of about 28° at the ultimate tip of the sharpened edge of razor blade stock.

---

This invention relates to methods and apparatus for producing an extremely sharp and durable cutting edge on a razor blade or similar cutting tool, and to improved razor blades manufactured in accordance with the methods and apparatus of the invention.

The sharpening of razor blades by mass production techniques involves a series of abrading operations (grinding and honing) to produce the desired sharp and durable shaving edge. Each abrading operation forms a facet on the blade edge being sharpened, which facet is modified by subsequent abrading operations of increasing fineness. In these series of abrading operations, it is essential to minimize possible damage to the ultimate tip of the blade edge while providing a uniform edge of the desired durability. A particular problem relates to so called "spot turn" defects which are produced at the end of the last abrading operation. Also, in certain razor blades, it is desirable that the thickness of the sharpened edge of the blade be minimized as a relatively thin edge appears to improve the shaveability characteristics of the blade. However, in order to provide adequate strength and durability of the blade, certain blade materials require a relatively large included angle at the ultimate tip of the sharpened edge. A particular example of such a blade material is flexible alloy steel material useful in a ribbon-type razor blade. Such steel interacts with abrading wheels in a manner that modifies the abrading characteristics of the abrading material.

Accordingly, it is an object of this invention to provide novel and improved methods and apparatus for forming a sharpened edge of high quality on cutting implements and particularly on the shaving edge of a razor blade.

Another object of the invention is to provide novel and improved methods and appartus for abrading the edge of a cutting tool in a manner which eliminates damage to the ultimate tip of the cutting tool that frequently occurs during the abrading process.

Still another object of the invention is to provide a novel and improved razor blade.

A further object of the invention is to provide novel and improved methods and apparatus for finish honing the cutting edge of a razor blade to provide a relatively thin blade edge having a durable shaving tip that produces high quality shaveability characteristics.

Still another object of the invention is to provide novel and improved methods and apparatus for sharpening a razor blade to a durable shaving edge of high quality in a manner in which it is not necessary to subject the shaving edge to a stropping operation after the final honing operation.

Still another object of the invention is to provide novel and improved methods and apparatus for utilizing honing wheels in the production of an improved quality razor blade.

In accordance with the invention, a facet on an edged cutting tool is formed by abrading in a manner such that the ultimate tip is abraded first and points increasingly remote from the ultimate tip are subsequently abraded in a manner that avoids further contact with the ultimate tip. It is also preferred to form the facets such that the included angle of the blade edge decreases as the distance along the facet surface from the ultimate tip increases, forming a facet surface of convex configuration. In the apparatus for forming these facet configurations, two abrading wheels of substantial axial length are disposed in juxtaposition so that their axes define a plane. The edge of the tool to be sharpened is then passed along a path inclined with respect to said plane so that the path approaches the plane along the direction of movement of the tool edge past the wheels.

In the preferred embodiment (the manufacture of high quality razor blades) convex facet surfaces are formed at a finish honing stage, subsequent to a grinding stage and a rough honing stage. Two juxtaposed finish honing abrasive wheels, each having a helical land formed in its circumferential surface, are mounted so that the two wheels are in interengagement and define a nip between them. The diameter of each wheel changes along its length so that the wheel is effectively tapered and therefore the angle between the abrasive surface at the intersection nip changes along the length of the assembled pair.

The angle of the plane defined by the axes of the honing wheels with respect to the path of the blade (tilt angle) may be varied over a substantial range but in particular embodiments, an angle of at least about 5° has been found to produce advantageous results. The range of angles of contact of the abrasive wheels with the edge being honed to convex facet surfaces may be changed for any given tilt angle, for example, by changing the length or diameter of the wheels or by changing the orientation of the axes of the wheels. The range of angle obtainable in the practice of the invention extends from an entrance half angle of 60° to an exit half angle of 0°. Generally, such an extended transition of contact angle is not necessary and in a particular embodiment an entrance half angle of 16° and an exit half angle of 7° has found to produce extremely satisfactory results.

By employing the larger angle at the entrance end, it has been found that the disturbance of the ultimate tip of the blade may be reduced particularly at the end of its contact with the honing wheels, producing a blade edge of improved quality. This feature is particularly advantageous in the case of steel that includes alloying elements such as chromium or molybdenum, which change the interaction between the steel and the abrading wheel and the abrading characteristics of the wheel. Such a steel is the relatively soft alloy steel particularly useful for flexible blades of the type used in a ribbon-type razor. It will be understood that, while the invention has particular advantages in connection with the final honing operation on a ribbon-type razor blade, it may be used with other abrading steps in the formation of the sharpened edge of other types of razor blades and other cutting implements.

A razor blade manufactured in accordance with the invention is characterized by abrasion marks disposed parallel to one another and at an angle of at least 1° to the normal to the blade edge. Such blades have improved shaveability characteristics without the necessity of utilizing an additional stropping step as is commonly used to straighten and smooth edges. The invention also may be used to provide smooth edge configuration with the ultimate tip of the blade having a relatively large included angle (which increases its durability) and a relatively thin shaving edge body.

Other objects, features, and advantages of the invention will be seen as the following description of a particular embodiment thereof progresses in conjunction with the drawings, in which.

Figure 1:
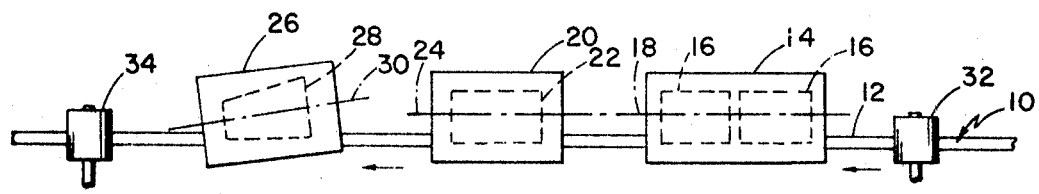
FIG. 1 is a diagrammatic side view of razor blade sharpening apparatus employed in practicing the invention.

There is shown in FIG. 1 in diagrammatic form, apparatus for sharpening the edge of a razor blade in accordance with the invention. The razor blade 10, which in this embodiment is in continuous strip form of uniform width and its principal metallurgical constituents in addition to iron are 0.40% carbon and 13.5% chromium, is to have only one (its upper) edge 12 sharpened. This upper edge 12 is subjected to grinding operations at stage 14 by a pair of grinding wheels 16 mounted for rotation about axes 18; a rough honing operation at stage 20 by a pair of honing wheels 22 mounted for rotation about axes 24; and a finish honing operation at stage 26 by a pair of tapered honing wheels 28 mounted for rotation about axes 30. The razor blade strip 10 is driven at uniform speed in suitable manner as indicated diagrammatically by output or take-up rolls 34.

In the illustrated embodiment, the grinding operation at stage 14 and the rough honing operation at stage 20 are performed with apparatus of conventional design, that is two abrading wheels mounted opposite sides of the razor blade strip. Each pair of wheels are driven in rotation about axes that extend parallel to the edge 12 of the blade strip 10. Razor blade sharpening equipment of this type is well known in the art, an example of such equipment being illustrated and described in Delafontaine U.S. Patent No. 2,709,874, and reference may be had thereto for illustration and description of constructional details of this general type of apparatus. In the illustrated embodiment, the abrading wheels at the grinding stage 14 are controlled to grind the edge 12 of the strip 10 to a controlled facet that has an included angle in the range of 9°–13°. This facet is then smoothed by abrading wheels of finer grit mounted in the rough honing stage 20 and form a second facet having an included angle in the range of 11°–17° and a facet length of approximately 0.005 inch.

Figure 5:
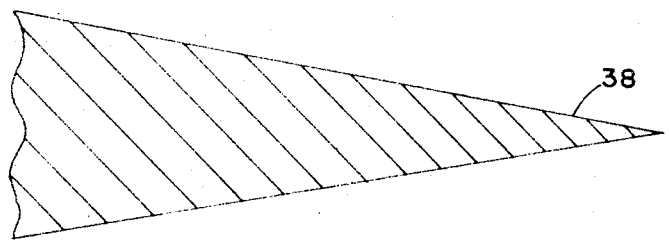
FIGS. 5 and 6 are diagrams of the configurations (enlarged twenty-four hundred times) of a conventionally sharpened edge of a razor blade and an edge of a razor blade sharpened in accordance with the invention respectively.
Figure 6:
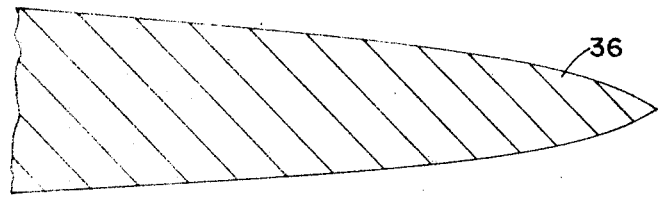

The rough honed blade edge 12 is then subjected to a finish honing operation at stage 26 in which the blade is subjected to an abrading operation from the ultimate tip back a distance of about 0.001 inch. This finish honing operation provides a convex facet surface 24 as illustrated in the diagram of FIG. 6 which has an included angle in the order of 28° at the ultimate blade tip. The configuration of the curved facet surface 36 may be contrasted with the substantially straight final facet surface 38 of the conventionally finish honed blade shown in FIG. 5.

Figure 2:
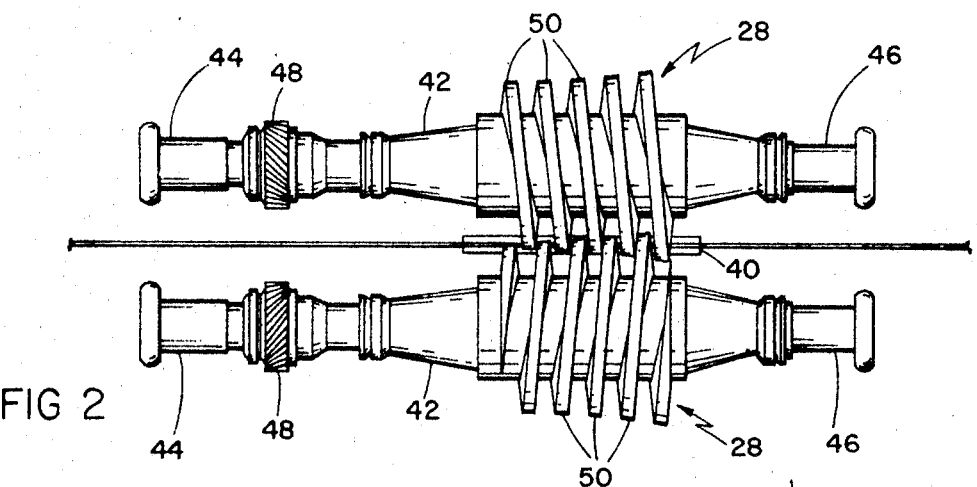
FIG. 2 is a diagrammatic top view of two finish honing wheels disposed in the configuration employed in the apparatus shown in FIG. 1 in the practice of the invention.
Figure 3:
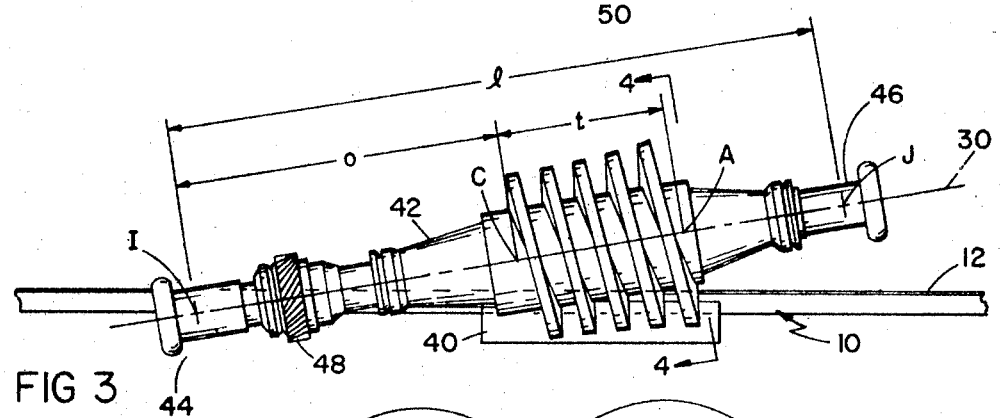
FIG. 3 is a diagrammatic side view of the finish honing wheel configuration shown in FIG. 2.
Figure 4:
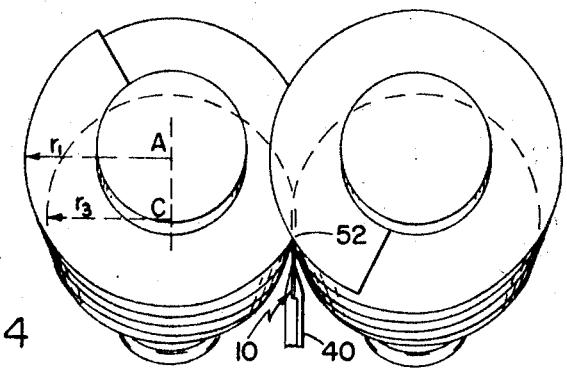
FIG. 4 is a diagrammatic end view of the finish wheel configuration shown in FIG. 2.

This convex configuration of the final facet 36 is produced by the final honing stage 26 through the use of two honing wheels 28 of modified frustoconical configuration that are mounted for rotation about parallel axes that are inclined at a tilt angle of about 5° relative to the blade path as defined by blade holder 40 as indicated in FIGS. 2–4. Each honing wheel 28 is manufactured of a suitably fine grade of abrasive material such as silicon carbide, alumina, diamond, or a combination of such materials. Each wheel 28 in this embodiment has a length of five inches and a radius ($r_1$) at its larger end (point A) of 2.800 inches; and a radius ($r_3$) at its smaller end (point C) of 2.712 inches. Each wheel 28 is mounted on a spindle 42 that includes bearing mounts 44, 46, the centers of which are spaced fourteen inches apart. A drive gear 48 is positioned on each spindle between bearing mount 44 and the honing wheel 28. The spindles 42 are mounted in suitable bearing blocks (not shown) for rotation about parallel axes that are inclined at 5° with respect to the direction of travel of blade 10 as guided by support 40 as indicated in FIGS. 1 and 3. The circumferential surface of each wheel 28 has a spiral helix formed on it to define a series of lands 50. The wheels are mounted so that these lands are interengaged and define a nip 52 through which the strip 10 passes as indicated in FIG. 4. Conventional arrangements (not shown) for cooling and lubricating the strip 10 and the honing wheels 28 are provided.

Figure 7:
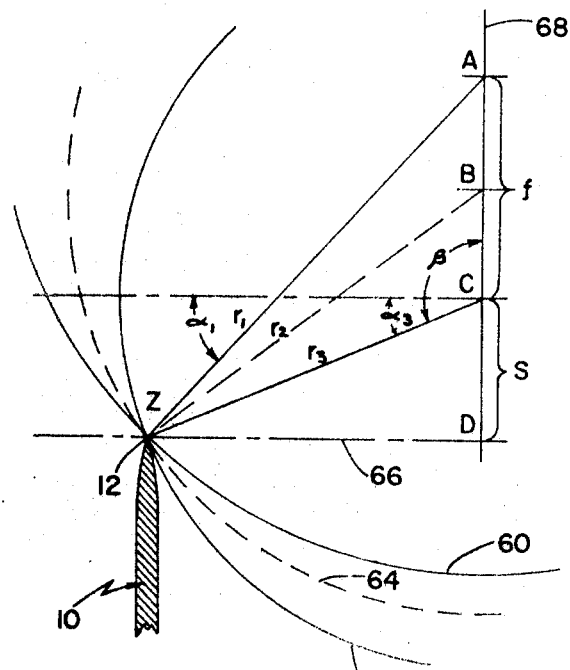
FIG. 7 is a geometric diagram illustrating a preferred form of the contour and mounting of a finish honing wheel in the practice of the invention.

A diagrammatic view illustrating the geometry of one of the wheels 28 relative to the edge 12 of the blade 10 as indicated in FIG. 7. In that figure the larger or entrance circumference of the finish honing wheel is indicated by arc 60, and the smaller or exit circumference of the honing wheel is indicated by arc 62. An intermediate circumference is indicated by dotted line 64. The path of the blade edge 12 is along a straight line perpendicular to line 66 and to the paper. The axis of spindle 42 is indicated by line 68 and the position of that axis in the longitudinal direction at the entrance end of the honing wheel is indicated at point A while the position of that axis at the exit end of the wheel is indicated at point C.

Figure 8:
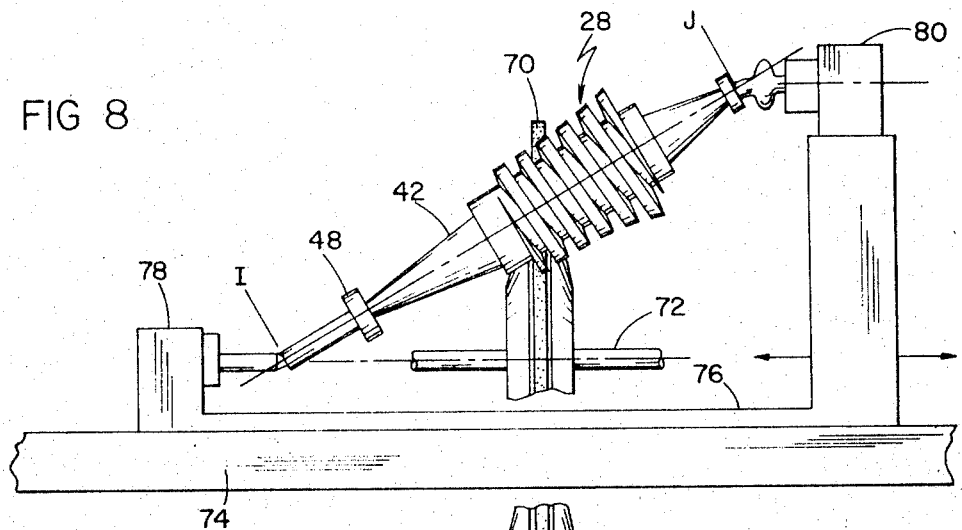
FIG. 8 is a schematic side view of structure for modifying the surface of the honing wheel for use in the apparatus shown in FIGS. 2-4.
Figure 9:
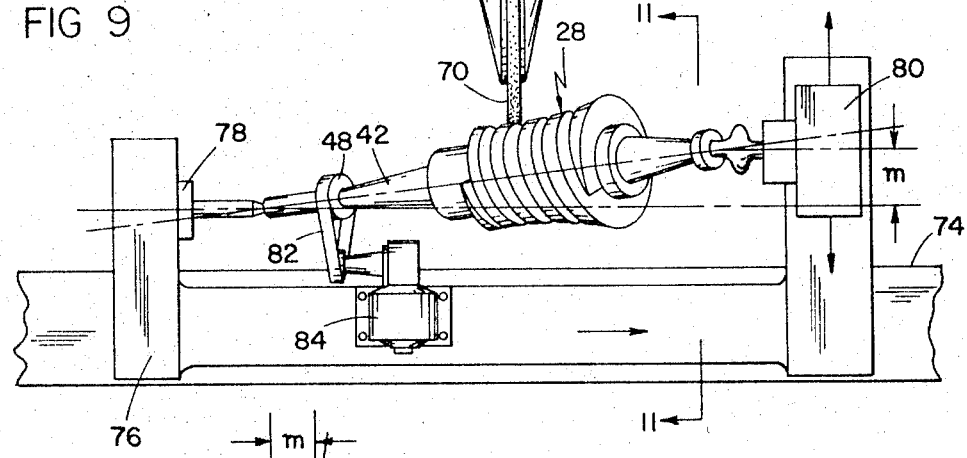
FIGS. 9 and 10 are schematic top and end views respectively of the apparatus shown in FIG. 8.
Figure 10:
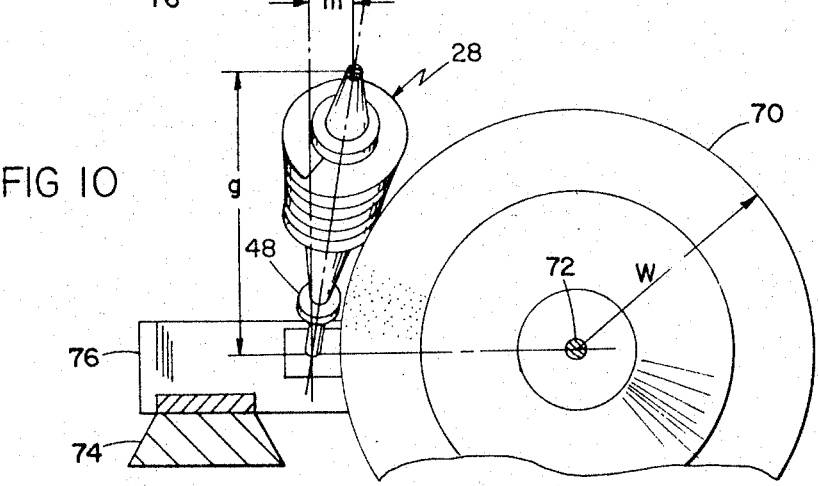

As the intersection of the frustoconical surfaces of wheels 28 (if their tapers were straight) is a hyperbola (the deviation from a straight line at the middle of the wheel is about 0.0085 inch over the five inch length in the above described embodiment) it is desirable to modify the configuration of the surfaces of the honing wheels slightly to provide a straight line of intersection between those wheels. In the preferred embodiment, this modification is accomplished by mounting the spindle 42 carrying an abrasive honing wheel 28, in a thread grinding machine of the type indicated in FIGS. 8-10 and dressing the finish honing wheel 28 by use of a dressing wheel which is moved in a generally transverse direction relative to the spindle 42. As indicated in FIGS. 8–10 there is provided a dressing wheel 70, 17.8 inches in diameter which is mounted for rotation about axis 72. Disposed adjacent dressing wheel 70 is table 74 on which carriage 76 is mounted for movement in a direction parallel to axis 72. Mounted on carriage 76 is a fixed tail stock structure 78 and an adjustable head stock structure 80. The spindle 42 carrying the finish honing wheel 28 to be dressed is positioned with its ends supported in the tail and head stocks 78, 80 respectively, and with its drive gear 48 in engagement with a suitable drive 82 (indicated diagrammatically) so that the spindle may be rotated by drive motor 84.

Figure 11:
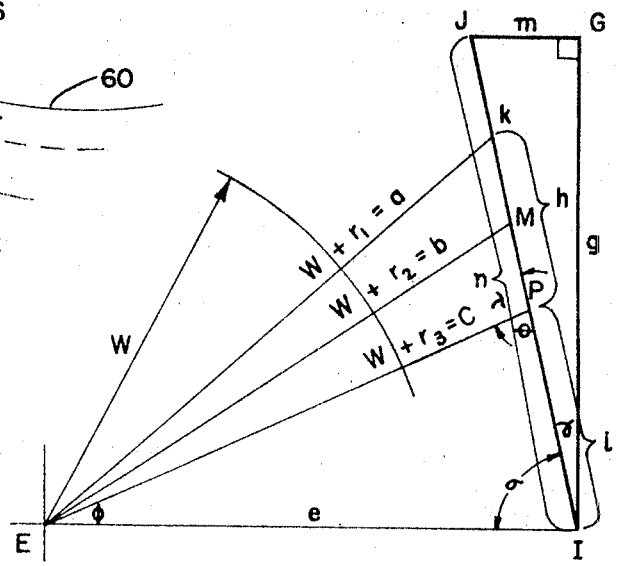
FIG. 11 is a geometric diagram indicating geometry for modifying a honing wheel surface by the apparatus shown in FIGS. 8-10.

With reference to the geometric diagram of FIG. 11, the coordinates of the position of the head stock 80 relative to the dressing wheel 70 involves decisions as to the angle of honing at the entrance end ($\alpha_1$—FIG. 7); the angle of honing at the exit end ($\alpha_3$—FIG. 7); and the radius $r_1$ that will cut the entry angle (some arbitrary radius less than that which exists in the wheel to be dressed).

The radius $r_3$ of the small end of the wheel then is determined from the equation:

$$r_3 = \frac{r_2 \cos \alpha_1}{\cos \alpha_3} \quad (1)$$

The elevation of the center of the large radius end of the wheel above the small radius end is determined from the equation:

$$f = \frac{r_1 \sin (\alpha_1 - \alpha_3)}{\cos \alpha_3} \quad (2)$$

The angle of tilt $\psi$ then machined into the head is determined where $\tau$=length of wheel face:

$$\sin \psi = \frac{r_1 \sin (\alpha_1 - \alpha_3)}{\tau \cos \alpha_3} \quad (3)$$

The calculation of the angular positioning of the wheel-spindle on the thread grinder bed requires the value of some third wheel radius between the large and small wheel radii. For convenience of calculation this intermediate radius $r_2$ is determined at a point half way between the two wheel ends. Where $AB=BC=f/2$ in FIG. 7.

By the Law of Cosines:

$$r_2^2 = r_3^2 + (f/2)^2 - 2r_3(f/2) \cos \beta \quad (4)$$

$$r_1^2 = r_3^2 + f^2 - 2r_3 f \cos \beta \quad (5)$$

multiply (4) by 2 and substract (5)

$$r_2 = \sqrt{\frac{r_1^2 + r_3^2 - f^2/2}{2}} \quad (6)$$

FIG. 11 is a schematic view transverse to the bed length of the thread grinder where $w$=radius of the dressing wheel and $r_1$, $r_2$, and $r_3$ are the abrasive wheel radii from FIG. 7. The axis of the wheel-mounted-spindle 42 is indicated in projection by the line I–J measured from the ends of the spindle 42. The angular positioning of this axis (the purpose of this calculation) is determined by the vertical coordinate $g$ (the elevation of the entry end of the honing wheel spindle over the exit end) and the horizontal coordinate $m$. The exit spindle end I is positioned by the fixed center of the thread grinder bed at the center of the dressing wheel 70 (shown as point E in FIG. 11). To determine the coordinates $m$ and $g$ of the spindle axis in FIG. 11, the values of angle $\gamma$ and the projected length $n$ are calculated.

The angle $\gamma$ is obtained from the simultaneous solution of the equations for triangles EKP and EMP in FIG. 11.

for EKP: $a^2 = h^2 + c^2 - 2hc \cos \lambda$ (7)

for EMP: $b^2 = h^2/4 + c^2 - hc \cos \lambda$ (8)

Multiply (8) by 2 and substract (7):

$$h = \sqrt{2a^2 + 2c^2 - 4b^2} \quad (9)$$

Substitute Equation 9 for $h$ in Equation 7 and:

$$\cos \lambda = \frac{a^2 - 4b^2 + 3c^2}{2c\sqrt{2a^2 - 4b^2 + 2c^2}} = \sin \theta \quad (10)$$

since: $\theta = 180° - \lambda$ $$\cos \theta = \frac{4b^2 - a^2 - 3c^2}{2c\sqrt{2a^2 - 4b^2 + 2c^2}} \quad (11)$$

The values of the sides of triangle EPI in FIG. 11 must be obtained in order to calculate the angles $\phi$ and then $\sigma$ and thence $\gamma$.

From proportional relationships (FIG. 3):

$$i = \frac{oh}{t} \quad (12)$$

and $$n = \frac{lh}{t} \quad (13)$$

where $o$ is the distance from the small end of the wheel 28 on the spindle to the center I of bearing 44 that couples the fixed center point of the thread grinder with the spindle end; $l$ is the distance between the centers I, J of bearings 44, 46 of the spindle 42; $t$ is the length of abrasive wheel 28; and $h$ was calculated in Equation 9.

From the triangle EPI in FIG. 11 and the law of cosines $$e^2 = c^2 + i^2 - 2ci \cos \theta \quad (14)$$

$$\sin \sigma = \cos \gamma = \frac{c \sin \theta}{e} \quad (15)$$

Eliminating $e$ from Equation 14

$$\cos \gamma = \frac{c \sin \theta}{\sqrt{c^2 + i^2 - 2ci \cos \theta}} \quad (16)$$

$$\sin \gamma = \cos \sigma = \frac{i - c \cos \theta}{e} \quad (17)$$

Again eliminating $e$ $$\sin \gamma = \frac{i - c \cos \theta}{\sqrt{c^2 + i^2 - 2ci \cos \theta}} \quad (18)$$

Therefore in triangle IJG in FIG. 11 and from Equations 12, 13 and 18:

$m$=horizontal coordinate=

$$\frac{n(i - c \cos \theta)}{\sqrt{c^2 + i^2 - 2ci \cos \theta}} \quad (19)$$

$g$=vertical coordinate=

$$\frac{nc \sin \theta}{\sqrt{c^2 + i^2 - 2ci \cos \theta}} \quad (20)$$

A calculation based upon the above formulation is performed as follows:

A decision is made that the entry angle $\alpha_1$ is to be 16 degrees and that a drop of 9 degrees will be provided across the finish hone wheel of length ($t$) of five inches so that $\alpha_3$ is 7 degrees. The wheel as furnished has a 3″ radius which will be dressed down to an entry radius $r_1$ of 2.8″.

From equations—

(1)            $r_3 = 2.71174''$
(2)            $f = 0.441307''$
(6)            $r_2 = 2.74738''$

By adding the dressing wheel radius $w$ (8.9″) to the values of $r_1$, $r_2$ and $r_3$, we obtain:

$a = 11.70000''$
$b = 11.64738''$
$c = 11.61174''$

From equations—

(9)            $h = 0.893962''$
(11)           $\cos \theta = 0.060610''$

Solving equation—

(10)           $\sin \theta = 0.998162''$

From equations—

(12)           $i = 1.55510''$
(13)           $n = 3.19950''$
(19)           $m = 0.2344''$
(20)           $g = 3.1909''$

The honing wheel 28 and spindle 42 is therefore mounted on the thread-grinder bed 74 so that the spindle end 46 near the large wheel diameter is positioned up 3.1909" and in (toward the dressing wheel) 0.2344". The 8.9" radius dressing wheel 70 is then fed into and across the rotating wheel-mounted-spindle 42 until the operator measures a diameter of 5.600" at the large wheel end.

It is desirable to chamfer the corners of the lands 50 to minimize the effect of transition between adjacent lands of the interengaged honing wheels 28 on the edge 12 of the blade 10. Further it is desirable to condition the honing wheels 28 by operation under relatively heavy feed conditions on a series of blades in a break-in operation prior to actual assembly of the honing wheels 28 into the sharpening line. Two finish honing wheels 28, configured and conditioned in the above-described manner, are then mounted at stage 26 in bearing blocks so that their axes are parallel and inclined at an angle of 5° with respect to the blade holder 40. The precise honing head setting is determined by applying a suitable pressure indicating medium (such as a grease) to the honing wheels and gently feeding the wheels into the blade edge 12. The settings of the spindles 42 are then adjusted to obtain uniform blade edge contact over the entire length of the wheels.

A blade strip 10 is fed through the sharpening apparatus at a speed of forty feet per minute and the honing wheels 28 are rotated to contact the blade edge 12 from opposite sides in a downward direction. As indicated above, this honing operation provides a curved facet configuration of the type indicated in FIG. 6. In processing thin stainless steel strip, 0.0015 inch in thickness, an included angle of about 28° at the ultimate tip is obtained. The final facet surfaces produced by this apparatus and method are smoothly curved, convex facets, free of major distortion as the distorting effect of final honing wheel contact on the thin blade stock at the output end of the finish honing stage 26 is eliminated.

While a particular embodiment of the invention has been shown and described, various modifications thereof will be obvious to those skilled in the art and therefore it is not intended that the invention be limited to the disclosed embodiment or to details thereof and departures may be made therefrom within the spirit and scope of the invention as defined in the claims.

What is claimed is:

1. Method of sharpening the edge of a cutting tool comprising the step of abrading a facet on the cutting tool edge to form convex facet surfaces in which the included angle of the facet decreases as the distance from the ultimate tip increases, comprising initial abrasion of the ultimate tip of the cutting tool at a relatively large included angle and subsequent abrasion of tool surfaces at increasingly greater distances from said ultimate edge while concurrently reducing the included angle during said subsequent abrasion.

2. A method of sharapening the edge of a razor blade comprising the steps of disposing two abrading wheels of substantial axial length for rotation about spaced axes that define a plane, rotating said wheels, in opposite directions and moving a razor blade along a straight path inclined with respect to said plane so that said path approaches said plane along the direction of movement of said blade past said wheels, said wheels contacting said blade in abrading relation throughout the axial length of said wheels.

3. Apparatus for sharpening a cutting tool comprising two abrasive wheels of substantial axial length disposed in cooperating juxtaposition, each said abrasive wheel being mounted for rotation about an axis, support for said abrasive wheels positioning said wheels so that their axes define a plane, and a tool guide for guiding the edge of the tool to be sharpened along a path that is inclined with respect to said plane so that said path approaches said plane along the direction of movement of said cutting tool past said abrasive wheels.

4. The apparatus as claimed in claim 3 wherein said path is inclined at an angle of at least 1° with respect to said plane.

5. The apparatus as claimed in claim 3 wherein said abrasive surfaces define a half angle at the entrance end in the order of 16° and a half angle at the exit end in the order of 7° and said path is inclined at an angle of at least about 5° with respect to said plane.

6. Apparatus for sharpening a cutting tool comprising two abrasive wheels of substantial axial length disposed in cooperating juxtaposition, each said abrasive wheel being mounted for rotation about an axis, each of said wheels being of generally frustoconical configuration and having a helical groove formed in its circumferential surface to define a helical land, the helical lands of said two abrasive wheels being in interengagement and defining a nip such that the angle between said abrasive surfaces of said wheels at said nip changes along the axial lengths of said wheels, support for said abrasive wheels positioning said wheels so that their axes define a plane, and a tool guide for guiding the edge of the tool to be sharpened along a path that is inclined with respect to said plane so that said path approaches said plane along the direction of movement of said cutting tool past said abrasive wheels.

7. The apparatus as claimed in claim 6 wherein the angle defined by said abrasive surfaces changes at least 2° over the axial length of said surfaces.

8. Razor blade sharpening apparatus comprising a guide structure for passing a razor blade element along a path at a sharpening operation, a grinding stage including a set of abrading wheels mounted adjacent said path for forming a first facet on the edge of razor blade element to be sharpened, a first honing stage including a first pair of juxtaposed abrading wheels mounted adjacent said path for modifying said first facet to form a second facet on the edge of said razor blade element, and a second honing stage including a second pair of juxtaposed abrading wheels mounted adjacent said path for modifying said second facet to form a third facet on the edge of said razor blade element in a sharpening operation, the axes of the wheels of each pair being parallel to one another, the axes of said first pair of juxtaposed wheels being disposed in a plane parallel to said path, and the axes of said second pair of wheels defining a plane inclined at an angle to said path, said path approaching said inclined plane along the direction of movement of said blade past said second pair of honing wheels, each wheel of said second pair having a helical groove cut in its circumferential surface so that said second pair of wheels intermesh and form a nip of substantial axial length, said nip defining a path generall parallel to said blade path and coincident therewith and defining an abrading angle between said juxtaposed second pair of abrading wheels.

9. The apparatus as claimed in claim 8 wherein each wheel of said second pair is generally frustoconical in configuration so that the nip of said second pair defines an included angle that changes substantially continuously over the axial length of said second pair of wheels and form a facet of convex configuration on the edge of said razor blade element.

10. The apparatus as claimed in claim 9 wherein the larger ends of said second pair of abrading wheels are disposed adjacent the entrance end of said second honing stage.

11. The apparatus as claimed in claim 10 wherein said second pair of honing wheels define, at their entrance end a nip angle in the order of 35° and at their exit end a nip angle in the order of 15°.

12. The apparatus as claimed in claim 11 wherein the axis of said second pair of abrading wheels define a plane that is disposed at an angle at least in the order of 5° with respect to said blade path.

References Cited

UNITED STATES PATENTS

| | | | |
|---|---|---|---|
| 1,269,831 | 6/1918 | McCaleb | 51—86 |
| 1,779,966 | 10/1930 | English | 51—80 |
| 1,957,602 | 5/1934 | Kylberg | 51—80 |
| 2,153,275 | 4/1939 | Schulze | 51—80 |
| 2,290,964 | 7/1942 | Hill | 51—80 |
| 2,658,695 | 11/1953 | Atchason | 51—87 |
| 2,692,457 | 10/1954 | Bindszus | 51—5 |
| 2,709,874 | 6/1955 | Delafontaine | 51—80 |

ROBERT C. RIORDON, Primary Examiner

D. G. KELLY, Assistant Examiner

U.S. Cl. X.R.

30—346.55; 51—102, 285